(12) United States Patent
Muller

(10) Patent No.: US 10,705,350 B2
(45) Date of Patent: Jul. 7, 2020

(54) PERCEIVED IMAGE DEPTH FOR AUTOSTEREOSCOPIC DISPLAYS

(71) Applicant: SoliDDD Corp., Brooklyn, NY (US)

(72) Inventor: Richard A. Muller, Berkeley, CA (US)

(73) Assignee: SOLIDDD CORP., Brooklyn, NY (US)

( * ) Notice: Subject to any disclaimer, the term of this patent is extended or adjusted under 35 U.S.C. 154(b) by 166 days.

(21) Appl. No.: 15/886,391

(22) Filed: Feb. 1, 2018

(65) Prior Publication Data

US 2018/0321501 A1 Nov. 8, 2018

Related U.S. Application Data

(63) Continuation of application No. 13/360,655, filed on Jan. 27, 2012, now abandoned.

(51) Int. Cl.
| | |
|---|---|
| *G02B 27/22* | (2018.01) |
| *G02B 30/27* | (2020.01) |
| *G02B 30/29* | (2020.01) |
| *G02B 27/00* | (2006.01) |

(52) U.S. Cl.
CPC ............. *G02B 30/27* (2020.01); *G02B 30/29* (2020.01); *G02B 27/0075* (2013.01)

(58) Field of Classification Search
CPC ............ G02B 27/2214; G02B 27/2221; G02B 27/2228; G02B 27/0075; G02B 30/27; G02B 30/28; G02B 30/29; G02B 30/39; G02B 30/31; G02B 30/32; H04N 13/0404; H04N 13/0406
USPC .......................... 359/462–464, 15, 54, 59, 32
See application file for complete search history.

(56) References Cited

U.S. PATENT DOCUMENTS

| | | |
|---|---|---|
| 2005/0264881 A1 | 12/2005 | Takagi et al. |
| 2007/0165013 A1 | 7/2007 | Goulanian et al. |
| 2008/0079805 A1* | 4/2008 | Takagi ................. H04N 13/305 348/51 |
| 2008/0144174 A1* | 6/2008 | Lucente ............... H04N 13/307 359/463 |

* cited by examiner

*Primary Examiner* — Marin Pichler
(74) *Attorney, Agent, or Firm* — Ference & Associates LLC

(57) ABSTRACT

An autostereoscopic display provides an extremely deep projection area by observing a relationship between a desired depth of projection and an autostereoscopic display design that includes a focal length of lenticles of a lenticular array and a number of views. The relationship specifies a projected depth at which lenticular crossover can occur for a given autostereoscopic with the specific lenticular focal length and number of views. Approximations can be used to simplify the relationship such that the projected depth is directly related to a product of the focal length and the number of views. To reduce optical aberrations, lenticles of the lenticular array include meniscus-cylinder lenses.

10 Claims, 10 Drawing Sheets

PERCEIVED IMAGE DEPTH FOR AUTOSTEREOSCOPIC DISPLAYS

CROSS REFERENCE TO RELATED APPLICATIONS

This application is a continuation application of co-pending U.S. patent application Ser. No. 13/360,655, filed Jan. 27, 2012, which in turn is a continuation-in-part of U.S. patent application Ser. No. 12/901,478, filed Dec. 8, 2010; the contents of each of these prior applications are hereby incorporated by reference as if set forth in their entirety.

FIELD OF THE INVENTION

The present invention relates generally to autostereoscopic displays, and, more particularly, to a video autostereoscopic display with significantly improved depth of projection.

BACKGROUND OF THE INVENTION

Conventional autostereoscopic displays use arrays of lenses or parallax barriers or other view selectors to make a number of pixels of the display visible to one eye of a viewing person and to make a number of other pixels of the display visible to the other eye of the viewing person. By isolating the pixels of the display visible to each eye, the two fields of a stereoscopic image can be presented on the display. The presentation of separate fields to each eye is often used to cause the viewer to perceive a three-dimensional image.

Current stereoscopic displays project a perceived depth of about a few centimeters. In other words, most autostereoscopic displays project portions of an image no more than about 1-2 centimeters in front of, and no more than about 1-2 centimeters behind, the display. Some autostereoscopic displays a purported to project a perceived depth of up to one foot, i.e., about 30 cm. However, such displays suffer from optical aberrations such a poor focus except for items projected near the surface of the display.

One of the major difficulties in projecting a greater depth of perception is that of optical artifacts in the lenticular array often used to select a different field to be visible to each eye of the human viewer. One such effect is that a given portion of the image can be visible in two or more places, such as in two or more lenticles of a lenticular array. Other effects include optical aberrations that are typically not noticeable with very short projected distances, such as just a few centimeters.

What is needed is an autostereoscopic display in which significantly greater projected depths of perception can be achieved without undesirable artifacts.

SUMMARY OF THE INVENTION

In accordance with the present invention, an autostereoscopic display provides an extremely deep projection area, for example appearing to have a depth of a meter or more, by observing a relationship between a desired depth of projection and an autostereoscopic display design that includes a focal length of lenticles of a lenticular array and a number of views. For parallax barrier autostereoscopic displays, the focal length is the distance between the parallax barrier and the underlying display having multiple views.

The relationship specifies a projected depth at which lenticular crossover can occur for a given autostereoscopic with the specific lenticular focal length and number of views. In some configurations, approximations can be used to simplify the relationship such that the projected depth is directly related to a product of the focal length and the number of views.

The autostereoscopic display configuration often specifies a view selector (such as a lenticular array) with a focal length much greater than typical focal lengths seen in conventional autostereoscopic display view selectors. One of the challenges with such long focal lengths in lenticles of a lenticular array is that a number of optical aberrations become noticeable and problematic.

To reduce these optical aberrations, lenticles of the lenticular array include meniscus-cylinder lenses, to provide a more flat field of view.

The result is an autostereoscopic display with depths of projection well beyond what conventional autostereoscopic displays are capable of, while still avoiding effects such as lenticular crossover and curved fields of view.

A BRIEF DESCRIPTION OF THE DRAWINGS

DETAILED DESCRIPTION OF THE INVENTION

Figure 1:
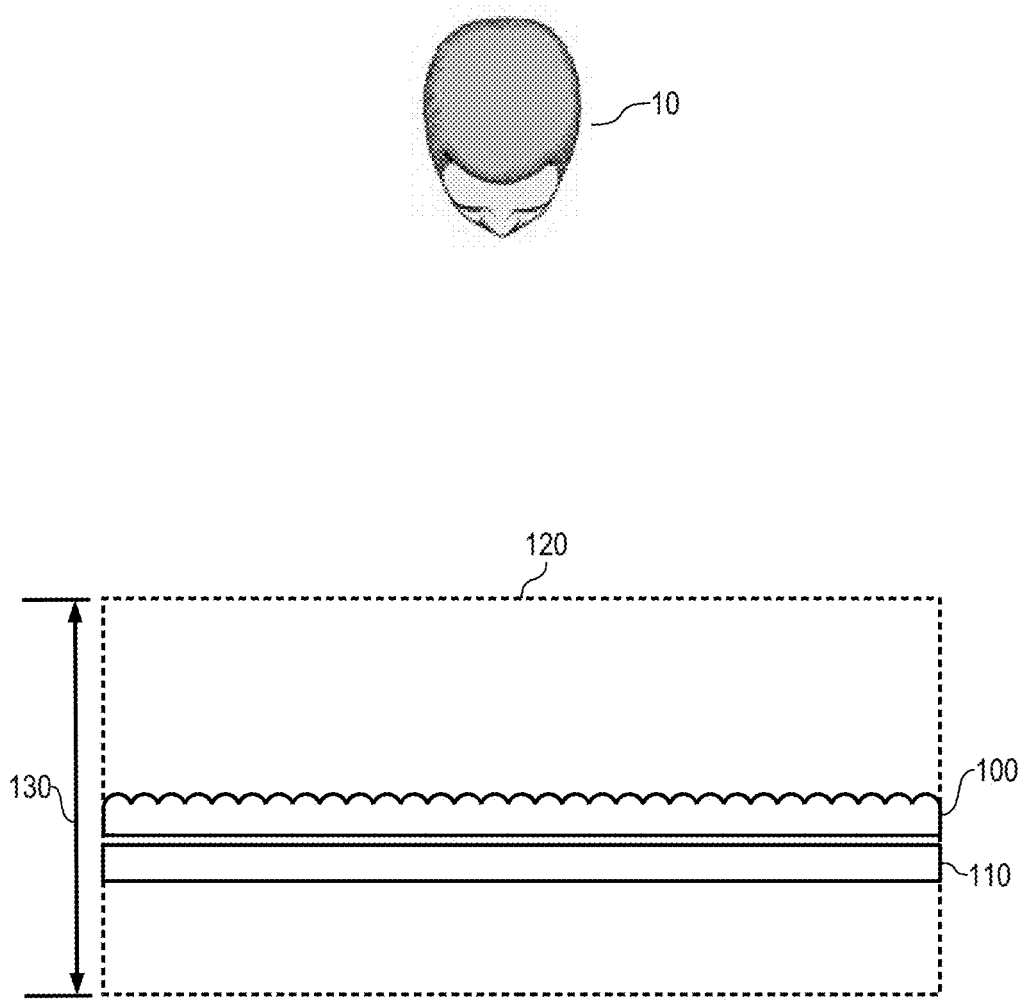
FIG. 1 shows an autostereoscopic display according to the present invention in conjunction with a human viewer and showing, in plan view, a three-dimensional area into which the autostereoscopic display can project elements shown in the display.

In accordance with the present invention, a depth 130 (FIG. 1) of a projection area 120 in which parts of an autostereoscopic display that includes a lenticular array 100 and a display 110 is dramatically improved—e.g., to a meter or more, 20-30 times what is seen in conventional autostereoscopic displays—by determining a relationship between depth 130 and an autostereoscopic display configuration at which a portion of display 110 can be visible at multiple locations (lenticular crosstalk). This relationship establishes a limiting configuration within which lenticular crosstalk is minimized. Once this relationship is determined for a desired depth 130, the autostereoscopic display is constructed to meet or exceed the autostereoscopic display configuration to ensure that lenticular crosstalk is only possible at depths of projection beyond depth 130.

The autostereoscopic includes a focal length of individual lenticles of lenticular array 100 and a number of views represented in display 110. Choosing a relatively deep projection area 120 produces a very long focal length for lenticular array 100 and a large number of views for display 110.

"A view" is used herein to refer to a subset of an image presented to a viewer from a particular angle of view. As an example, it is helpful to consider a simple autostereoscopic display in which one eye of the human viewer can see every odd-numbered column of pixels and the other eye of the viewer can see every even-numbered column of pixels. The odd-numbered columns of pixels would collectively represent one view, and the even-numbered columns of pixels would collectively represent another view. It should be appreciated that most autostereoscopic displays have many more than just two views and that this very simple example is merely to illustrate how "view" is used herein.

In this illustrative embodiment, lenticular array 100 includes a number of vertical lenticles that makes one of a number of view elements visible depending upon the angle of perspective of an eye of viewer 10. In other words, for each of the views that can be visible through lenticular array 100, each lenticle of lenticular array 100 covers a portion of that view, sometimes referred to herein as a view element, and makes that view element visible from a given angle of perspective. In embodiments in which display 110 is an electronic display, such as an LCD for example, view elements are collections of pixels. In embodiments in which display 110 is a static image such as a poster, view elements can be tall, thin slivers of one of a number of views printed or otherwise represented visually in display 110.

Design of lenticular 100 and display 110 begins with selecting a designed depth 130 of projection area 120. In this illustrative embodiment, depth 130 is selected to be one meter, much, much deeper than any currently available autostereoscopic displays.

Figure 2:
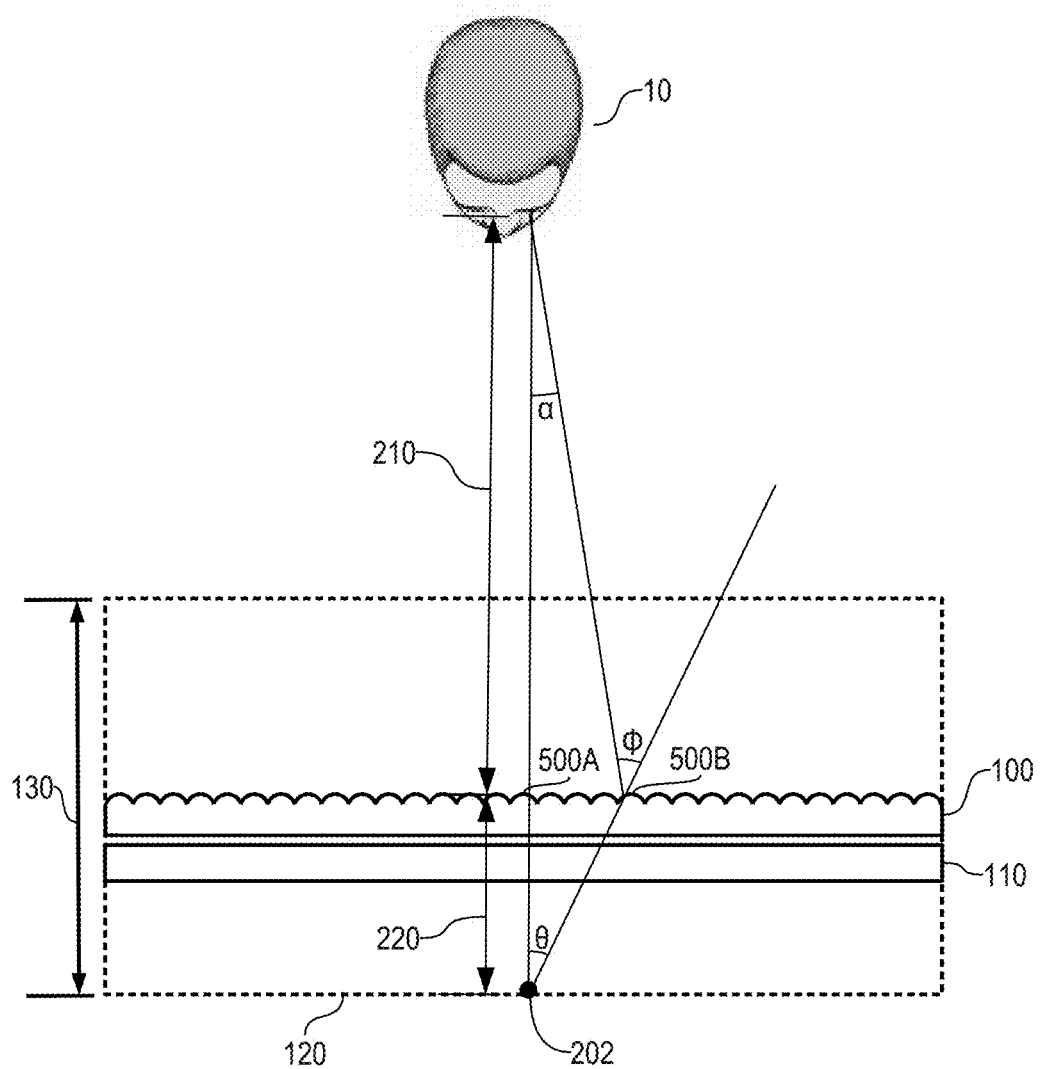
FIG. 2 shows the autostereoscopic display and viewer of FIG. 1 and shows the projection of a picture element behind the display.

FIG. 2 illustrates a circumstance to be avoided that therefore sets a limit on high-quality autostereoscopic display with a projected area 120 having depth 130. The left eye of viewer 10 sees a portion of display 110 through lenticle 500A and that portion of display 110 appears to be at point 202 as a result of the focal length of lenticle 500A. The same portion of display 110 can also be seen through lenticle 500B and every lenticle between lenticle 500A and lenticle 500B. Light travels from point 202 at an angle θ and is bent by lenticle 500B at an angle φ to the left eye of viewer 100. This phenomenon of a single portion of display 110 being visible to viewer 10 through multiple lenticles of lenticular array 100 is sometimes referred to herein as lenticular crosstalk.

Lenticular array 100 and display 110 are designed to provide a projection area 120 of depth 130 with minimum lenticular crosstalk.

The angles of FIG. 2 are related to one another as follows:

$$\theta + \alpha = \varphi \quad (1)$$

These angles can be rewritten in terms of dimensions of lenticular array 100, display 110, and projection area 120.

$$\theta = \tan^{-1}\frac{NS}{d} \approx \frac{NS}{d} \quad (2)$$

In equation (2), S is the spacing of lenticles of lenticular array 100, i.e., the width of a single lenticle. N is the offset of lenticle 500B from lenticle 500A in terms of a number of lenticles. Thus, NS is the offset of lenticle 500B from lenticle 500A as a measured distance. In equation (2), d is projection depth 220, i.e, the distance from lenticular array 110 that point 202 is projected. The last portion of equation (2) estimates the arctangent function using small angle approximation, which is appropriate in most practical implementations of lenticular array 100 and display 110.

$$\alpha = \tan^{-1}\frac{NS}{D} \approx \frac{NS}{D} \quad (3)$$

In equation (3), D is distance 210, i.e, the distance from lenticular array 110 to the eye of viewer 10. The last portion of equation (3) estimates the arctangent function using small angle approximation, which is appropriate in most practical implementations of lenticular array 100 and display 110.

Angle φ depends on the size (δ) of the portion of display 110 to be shown through a single lenticle as a part of a single view and on the distance (f) of that portion from lenticle 500B. Equation (4) shows angle φ in terms of δ and f of lenticular array 110.

$$\varphi = \frac{\delta}{2f} \quad (4)$$

Using equations (2), (3), and (4), equation (1) can be rewritten as follows:

$$\frac{NS}{d} + \frac{NS}{D} = \frac{\delta}{2f} \quad (5)$$

Small angle approximation of arctangent values should not be used in equation (5) when such introduces appreciable error.

The number of views ($n_v$) represented by display 110 relates to the size (δ) of the portion of display 110 and lenticular size (S) as follows:

$$n_v = \frac{NS}{\delta} \quad (6)$$

To minimize lenticular crosstalk, N is chosen to be one (1) to identify a configuration at which lenticular crosstalk between adjacent lenticles is possible. Using the relationship of equation (6), setting N to 1, and applying some algebra yields the following relationship between configuration of lenticular array 100 and display 110 and a maximum projection depth d at which lenticular crosstalk begins between adjacent lenticles for a viewer a distance, D, away:

$$2n_v f = {\frac{1}{d} + \frac{1}{D}}^{-1} \quad (7)$$

Figure 3:
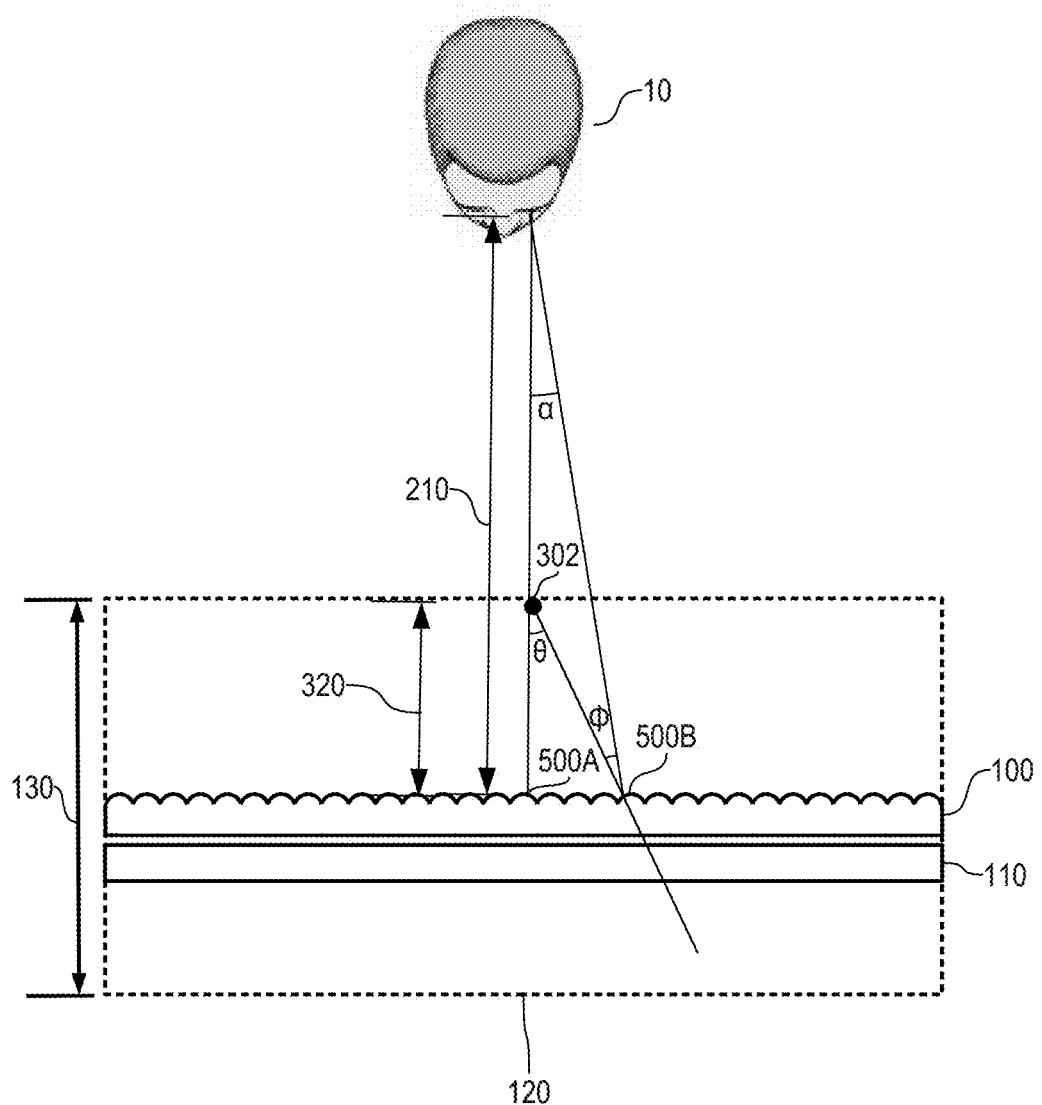
FIG. 3 shows the autostereoscopic display and viewer of FIG. 1 and shows the projection of a picture element before the display.

A similar relationship is observed for parts of display 110 projected toward viewer 10 as shown in FIG. 3, and this relationship is as follows:

$$2n_v f = \left[\frac{1}{d} - \frac{1}{D}\right]^{-1} \quad (8)$$

In situations in which D is much greater than d, 1/D can be approximated by zero. The result is that equations (7) and (8) can then both be expressed as:

$$2n_v f = d \quad (9)$$

In equation (8), d represents distance 320 (FIG. 3), which is chosen to be the same as distance 210 (FIG. 2) in this illustrative embodiment.

The particular measure of depth 130 of projection area 120 at which lenticular crosstalk can happen between adjacent lenticles is given by 2d:

$$2d = 4n_v f \quad (10)$$

Equation (10) provides guidance in designing lenticular array 100 and display 110 to provide a desired depth 130 of projection area 120 within which lenticular crosstalk is avoided. In particular, the focal length of the lenticles of lenticular array 100 and the number of views provided by display 110 are chosen such that four (4) times their product is at least the desired depth.

If more precision is required in designing a depth of a projection area, the approximations used in equations (1)-(10) above can be excluded. The resulting, exact version of equation (10) is as follows:

$$2n_v f = \frac{dD - S^2}{D + d} \quad (11)$$

It should be observed that as D gets very large relative to other values in equation (11), equation (11) is approximated by equation (10).

As an illustrative example using equation (10), consider that depth 130 of projection area 120 is to be one meter. To achieve this, the product of the number of views of display 110 and the focal length of lenticles of lenticular array 100 should be at least one-quarter of a meter, or 25 centimeters. A typical conventional design would include eight views and a focal length of 1 millimeter, providing a projection area having a maximum depth of about 3.2 cm while still avoiding lenticular crosstalk. However, lenticular array 100 and display 110 require dimensions way beyond those to achieve the desired depth of projection. For example, if lenticular array 100 is designed to include lenticles whose focal lengths are one centimeter and display 110 is designed to include 25 views, projection area 120 would have a maximum depth 130 of one meter with little or no lenticular crosstalk.

Without the benefit of equations (10) and (11), the trend is to make autostereocopic displays, both static images and dynamic monitors, thinner and to have a greater apparent resolution. Such is directly contrary to extending the focal length of lenticles of a lenticular array to dramatically improve the perceived depth of the autostereoscopic display as suggested by equation (10). In the example above, increasing the focal length of a conventional lenticle by 1,000% (from 1 mm to 1 cm) and increasing the number of views to twenty-five (25) improves the apparent depth by 3,000% (from 3.2 cm to 1 m).

At the expense of thinness of the lenticular array, lenticles with focal lengths significantly greater than the width of the lenticles can provide very dramatic improvements in the perceived depth of an autostereoscopic display without introducing lenticular crosstalk. In the example above, the lenticles have a focal length that is ten (10) times their width and provide an apparent depth without lenticular crosstalk that is thirty (30) times that of a comparable conventional autostereoscopic display. Lenticles that have a focal length that is merely five (5), or even just three (3), times their width still provide dramatic results.

The following Table provides a number of examples of crosstalk-free apparent depths of autostereoscopic displays according to equation (10) above.

TABLE A

| Display Type Size (in) | Hor. Res. (ppi) | S | f | $n_v$ | 2d | $\frac{f}{S}$ |
|---|---|---|---|---|---|---|
| Bookmark | 1200 | 0.01" | 0.05" | 12 | 1.6" | 5 |
| 1" × 6" | 1200 | 0.02" | 0.1" | 24 | 6.4" | 5 |
|  | 2400 | 0.02" | 0.1" | 48 | 12.8" | 5 |
| Business card | 1200 | 0.01" | 0.05" | 12 | 1.6" | 5 |
| 2.5" × 2" | 1200 | 0.015" | 0.05" | 18 | 2.4" | 3.33 |
|  | 2400 | 0.02" | 0.05" | 48 | 6.4" | 2.5 |
| Postcard | 1200 | 0.01" | 0.04" | 12 | 1.28" | 4 |
| 5" × 3" | 1200 | 0.015" | 0.05" | 18 | 2.4" | 3.33 |
|  | 2400 | 0.02" | 0.05" | 48 | 6.4" | 2.5 |
| Digital Picture Frame | 240 | 0.025" | 0.1" | 6 | 1.6" | 4 |
| 6" × 4" | 1440 (×6) | 0.019" | 0.1" | 28 | 7.47" | 5.14 |
| Smart Phone | 326 | 0.012" | 0.05" | 4 | 0.53" | 4.08 |
| 4" × 2" | 3912 (×12) | 0.01" | 0.05" | 40 | 5.33" | 4.89 |
| Tablet Computer | 1584 (×12) | 0.015" | 0.1" | 24 | 6.4" | 6.6 |
| 7.75" × 5.8" | 3912 (×12) | 0.009" | 0.05" | 36 | 4.8" | 5.43 |
| 46" HDTV | 48 | 0.125" | 0.5" | 6 | 12" | 4 |
| 40" × 22.5" | 576 (×12) | 0.042" | 0.4" | 24 | 38.4" | 9.6 |
| 46" UDTV 40" × 22.5" | 1152 (×12) | 0.042" | 0.4" | 48 | 76.8" | 9.6 |
| 85" HDTV | 25.95 | 0.0231" | 0.75" | 6 | 12" | 2.16 |
| 74" × 41.5" | 311.35 (×12) | 0.077" | 0.4" | 24 | 38.4 | 5.19 |
| 85" UDTV 74" × 41.5" | 622.7 (×12) | 0.077" | 0.4" | 48 | 76.8" | 5.19 |
| 20" WQXGA Monitor 17.5" × 10" | 1755.43 (×12) | 0.036" | 0.2" | 64 | 51.2" | 5.49 |

TABLE A-continued

| Display Type Size (in) | Hor. Res. (ppi) | S | f | $n_v$ | 2d | $\frac{f}{S}$ |
|---|---|---|---|---|---|---|
| Display Wall of 40" HDTVs tiled 4 × 4 160" × 90" | 144 (×3) | 0.083" | 1.0" | 12 | 48" | 12 |
| Single-Sheet Poster 28" × 42" | 600 | 0.04" | 0.4" | 24 | 38.4" | 10 |
| 10' × 5' Static Sign 120" × 60" | 200 | 0.04" | 0.4" | 24 | 38.4" | 10 |
|  | 600 | 0.12" | 0.4" | 24 | 38.4" | 3.33 |
| 48' × 14' Billboard 576" × 168" | 100 | 0.48" | 2.0" | 48 | 256" (21.33') | 4.17 |
|  | 300 | 0.16" | 2.0" | 48 | 256" (21.33') | 12.5 |
|  | 600 | 0.08" | 2.0" | 48 | 256" (21.33') | 25 |
| 48' × 14' Billboard with 4 mm pitch LEDs 576" × 168" | 50.4 (×8) | 0.476" | 6.0" | 24 | 576" (48') | 12.6 |
| 48' × 14' Billboard with 3 mm pitch LEDs 576" × 168" | 68 (×8) | 0.353" | 6.0" | 24 | 576" (48') | 17 |

As used herein, the "(×3)", "(×6)", "(×8)", and "(×12)" notes in the horizontal resolution (ppi) column above indicate application of one or more of the following technologies: (i) the subpixel remapping described in U.S. patent application Ser. No. 12/868,038 filed Aug. 25, 2010 by Dr. Richard A. Muller for "Improved Resolution for Autostereoscopic Video Displays" (hereinafter the '038 application) and (ii) the pixel time multiplexing described in U.S. patent application Ser. No. 12/969,552 filed Dec. 15, 2010 by Dr. Richard A. Muller for "Improved Resolution For Autostereoscopic Video Displays" (hereinafter the '552 application). Both of those descriptions are incorporated herein by reference.

The subpixel remapping taught by the '083 application teaches how to triple the horizontal resolution of a video display. The "(×3)" note indicates use of this technology alone. The time multiplexing taught by the '552 application teaches how to double the apparent horizontal resolution of a video display one or more times, thereby scaling the apparent horizontal resolution by an integer power of two. The "(×8)" indicates use of three (3) doubling layers to produce an eight-fold increase in the apparent to horizontal resolution of the display. The "(×6)" and "(×12)" notes indicate a combination of the tripling of apparent horizontal resolution described in the '083 application with a single-layer doubling and a double-layer quadrupling, respectively, of the apparent horizontal resolution described in the '552 application.

It should also be appreciated that the horizontal resolutions specified in Table A are in pixels per inch (ppi), not dots per inch (dpi). In addition, resolutions for smart phones and tablet computers take into consideration resolutions of iPhone and iPad products using Retina displays available from Apple Inc. of Cupertino, Calif., which are purported to provide 326 pixels per inch.

Traditionally, and without the benefit of equations (10) and (11), the trends in autostereoscopic displays has been to minimize thickness. There has generally been a perceived trade-off in autostereoscopic display quality between greater apparent horizontal resolution and the number of views. To avoid loss of views, lenticles have generally been kept relatively shallow (short focal lengths) and broad. Shallowness of lenticles maintains the thinness of the autostereoscopic display but limits the focal length of the lenticles. Lenticle breadth allows more views behind each lenticle. Accordingly, the ratio of lenticle focal length (f) to lenticle width (S) is low in conventional autostereoscopic displays—typically no greater than about 1:1.

However, equations (10) and (11) illustrate the value of dramatically increasing the focal length of the lenticles. Accordingly, the ratio of lenticle focal length (f) to lenticle width (S) in autostereoscopic displays designed according to the present invention are significantly greater. This ratio is sometimes referred to herein as a lenticular aspect ratio. As shown in Table A above, lenticular aspect ratios are generally at least 2.5:1, more commonly 3:1, 4:1, 5:1, 6:1, and even greater than 10:1 in some displays. The result is that a one-inch-wide bookmark can have an error-free perceived depth of about 12.8 inches. Similarly, a 46" HDTV can have an error-free perceived depth of about one meter. Autostereoscopic smart phones displays can have an error-free perceived depth of over five (5) inches, and autostereoscopic tablet computer displays can have an error-free perceived depth of over six (6) inches. Large, billboard-sized displays can have error-free perceived depth of over 20 feet, even as much 48 feet.

These maximum error-free perceived depths are far beyond what any prior autostereoscopic displays have been able to achieve. Exemplary minimum ratios of maximum error-free perceived depths to display widths are summarized in Table C below.

TABLE B

| Display Type | Minimum Viewing Distance | Display Width | Exemplary Minimum Ratios of Maximum Projection Depth $(4n_vf)$ to Width |
|---|---|---|---|
| Business cards, Postcards, Digital Picture Frames, Smart Phones, Tablet Computers | 12 inches | 2.5 to 18 inches | 0.4:1, 0.6:1, 0.9:1 |
| Digital Picture Frames, Smart Phones, Tablet Computers, and Televisions | 12 inches | >4 inches | 0.5:1, 1:1, 1.2:1 |
| Digital Picture Frames, Smart Phones, Tablet Computers, and Small to Medium Prints | 12 inches | 5-18 inches | 0.25:1, 0.4:1, 1:1 |
| Small to Medium Televisions (1080p and WQXGA, for example) | 48 inches | 17-35 inches | 0.25:1, 0.4:1, 0.8:1, 1:1 |
| Larger Televisions | 48 inches | >40 inches | 0.8:1, 0.9:1, 1:1 |
| Very Large Televisions and Large Video Displays | 60 inches | >74 inches | 0.2:1, 0.4:1, 06:1 |
| Medium-Large Printed Posters | 48 inches | >28 inches | 0.6:1, 0.8:1, 1:1 |
| Large Printed Posters | 48 inches | >56 inches | 0.3:1, 0.5:1, 0.8:1 |
| Very Large Printed Posters | 48 inches | >120 inches | 0.1:1, 0.2:1, 0.3:1 |
| Billboards | 96 inches | >576 inches | 0.1:1, 0.25:1, 0.4:1 |
| Large Dynamic and Static Displays | 96 inches | >100 inches | 0.15:1, 0.2:1, 0.3:1 |

Figure 10:
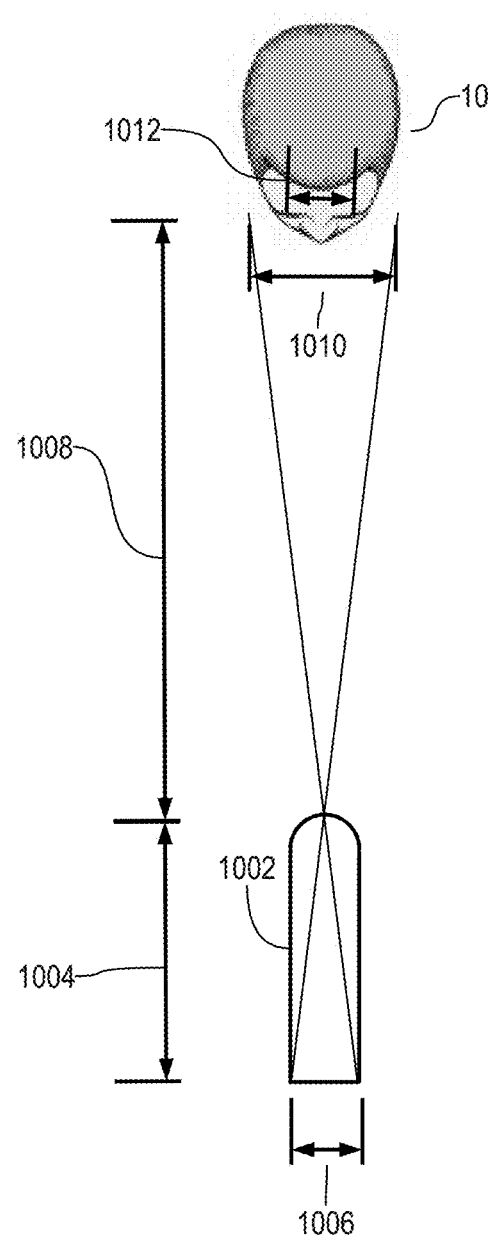
FIG. 10 is an example lenticular array aspect ratio in an autostereoscopic display embodiment.

There is a practical limit to how great the lenticular aspect ratio can be in autostereoscopic displays. FIG. 10 is illustrative.

Given a lenticle 1002 having a focal length 1004 (f) and a width 1006 (S), the width 1010 of a viewing "sweet spot" at viewing distance 1008 is given by the following equation:

$$W = \frac{SD}{f} \quad (12)$$

In equation (12), W is width 1010 of the viewing sweet spot, and D is viewing distance 1008. The sweet spot is defined as a position in which both eyes of viewer 10 see a view corresponding to the same lenticle, e.g., lenticle 1002. If width 1010 is not at least the intraocular distance 1012 of viewer 10, viewer 10 will not be able to see both left and right views through the same lenticle and the autostereoscopic image will not be clearly visible. In addition, the amount by which viewer 10 can move his head side-to-side and still see the autostereographic image properly is given by the following equation:

$$W_{SS} = \frac{SD}{f} - E \quad (13)$$

In equation (13), $W_{SS}$ is the amount by which viewer 10 can move his head side-to-side and still see the autostereographic image properly, and E is the intraocular distance 1012 of viewer 10. A typical intraocular distance for adult viewers is about 2.4 inches. Herein, the amount by which viewer 10 can move his head side-to-side and still see the autostereographic image properly is sometimes referred to as a practical viewing sweet spot.

The practical viewing sweet spots $W_{SS}$ for the various types of displays in Table A above at various viewing distances are shown in Table C below.

TABLE C

| Display Type | $\frac{f}{S}$ | D | $W_{SS}$ |
|---|---|---|---|
| Bookmark, Business card, Postcard, Smart Phone, Digital Picture Frame, Tablet Computer | 2.5 | 2' | 7.2" |
| | 3.33 | 2' | 4.8" |
| | 4 | 2' | 3.6" |
| | 5 | 2' | 2.4" |
| | 6.6 | 2' | 1.24" |
| 46" HDTV/UDTV, 85" HDTV/UDTV, Display Wall of 40" HDTVs tiled 4 × 4, 20" WQXGA Monitor, Single-Sheet Poster, 10' × 5' Static Sign, Digital Picture Frame, Tablet Computer | 4 | 8' | 21.6" |
| | 5 | 8' | 16.8" |
| | 6.6 | 8' | 12.15" |
| | 9.6 | 8' | 7.6" |
| 46" HDTV/UDTV, 85" HDTV/UDTV, Display Wall of 40" HDTVs tiled 4 × 4, 20" WQXGA Monitor, Single-Sheet Poster, 10' × 5' Static Sign | 2.16 | 20' | 108.6" |
| | 5 | 20' | 45.6" |
| | 10 | 20' | 21.6" |
| | 12 | 20' | 17.6" |
| 10' × 5' Static Sign, 48' × 14' Billboard | 3.33 | 100' | 357.6" |
| | 10 | 100' | 117.6" |
| | 12.5 | 100' | 93.6" |
| | 17 | 100' | 68.19" |
| | 25 | 100' | 45.6" |

As can be seen in Table B, hand-held devices that are typically viewed from about two (2) feet away have lenticular aspect ratios of about 2.5 to 6.6 and corresponding practical viewing sweet spots of about 7.2 down to 1.24 inches. Hand-held displays can be easily tilted by viewer 10 to find the practical sweet spot, so a practical sweet spot of only 1.24 inches isn't particularly worrisome for a hand-held display. Generally, the largest hand-held device display measures about 17 inches diagonally. Thus, as long as the lenticular aspect ratio of such a display is below 7, viewer 10 should be able to properly perceive the autostereoscopic display.

Larger displays, such as televisions and posters and sometimes digital picture frames and tablet computers (when used as a digital picture frame), are more typically viewed from up to about eight (8) feet away. These types of display have lenticular aspect ratios of about 4 to 9.6 and corresponding practical viewing sweet spots of about 21.6 down to 7.6 inches, providing ample room for viewer 10 to move his head to view the autostereoscopic display properly.

While a practical viewing sweet spot of only 7.6 inches may sound like at most a single viewer can see the autostereoscopic display properly or perhaps two viewers with their heads pressed uncomfortably close together, it should be appreciated that there are many 7.6-inch-wide practical viewing sweet spots. In particular, the viewing sweet spot (10 inches in this example), repeat contiguously through the range of visibility of an autostereoscopic display. Only when the eyes of viewer 10 straddle a boundary between adjacent viewing sweet spots that the eyes see views behind two distinct lenticles and the autostereoscopic view is improper. In such a situation, viewer 10 needs only to move his head up to 1.2 inches in either direction to position both eyes in a single viewing sweet spot. Within that viewing sweet spot, viewer 10 can move his head within a space that is 7.6 inches wide.

Televisions and other large displays are commonly viewed from up to about twenty (20) feet away, ie., from across a large room. These types of display have lenticular aspect ratios of about 2.16 to 12 and corresponding practical viewing sweet spots of about 108.6 down to 17.6 inches, providing ample room for viewer 10 to move his head to view the autostereoscopic display properly.

As viewing distances become large, width of the practical viewing sweet spot becomes much less of a limitation. In very large displays, such as billboards and large posters, it is common for the display to be viewed from 100 feet away. These types of display have lenticular aspect ratios of about 3.33 to 25 and corresponding practical viewing sweet spots of about 357.6 down to 45.6 inches—roughly 30 down to four (4) feet, providing ample room for viewer 10 to move his head to view the autostereoscopic display properly.

Figure 4:
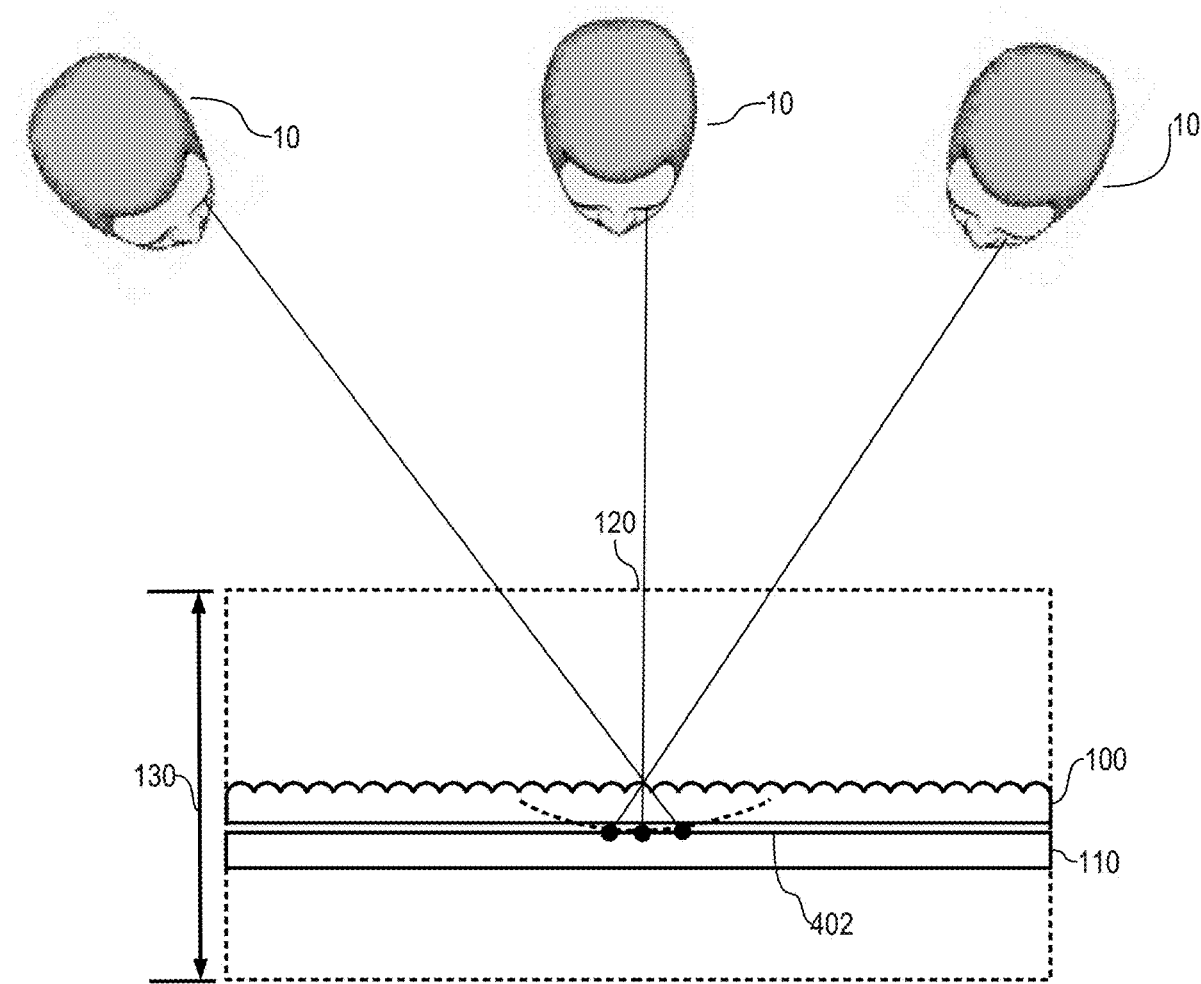
FIG. 4 shows the autostereoscopic display and viewer of FIG. 1 and shows the reduced curvature of field achieved in accordance with the present invention.

One of the challenges in making a lenticular array with such a long focal length is that optical aberrations become significant and detrimental to the viewer's three-dimensional viewing experience. One such aberration is illustrated in FIG. 4 and is generally known as curvature of field. Lenticles of conventional lenticular arrays focus along a curved field of view 404. However, at such small focal lengths used in conventional lenticular lenses render this aberration hardly noticeable to viewers at most angles of view. Simply modifying conventional lenticular arrays to have ten (10) times the focal length as described above would render this aberration very noticeable at most angles of view. Lenticular array 100 is designed to provide a much more flat field of view than conventional lenticular arrays. Such flattening is analogous to flattening that is accomplished in spherical lenses by applying the "Petzval condition", a known equation that is typically applied to spherical lenses rather than the cylindrical, lenticular lenses described here.

Figure 5:
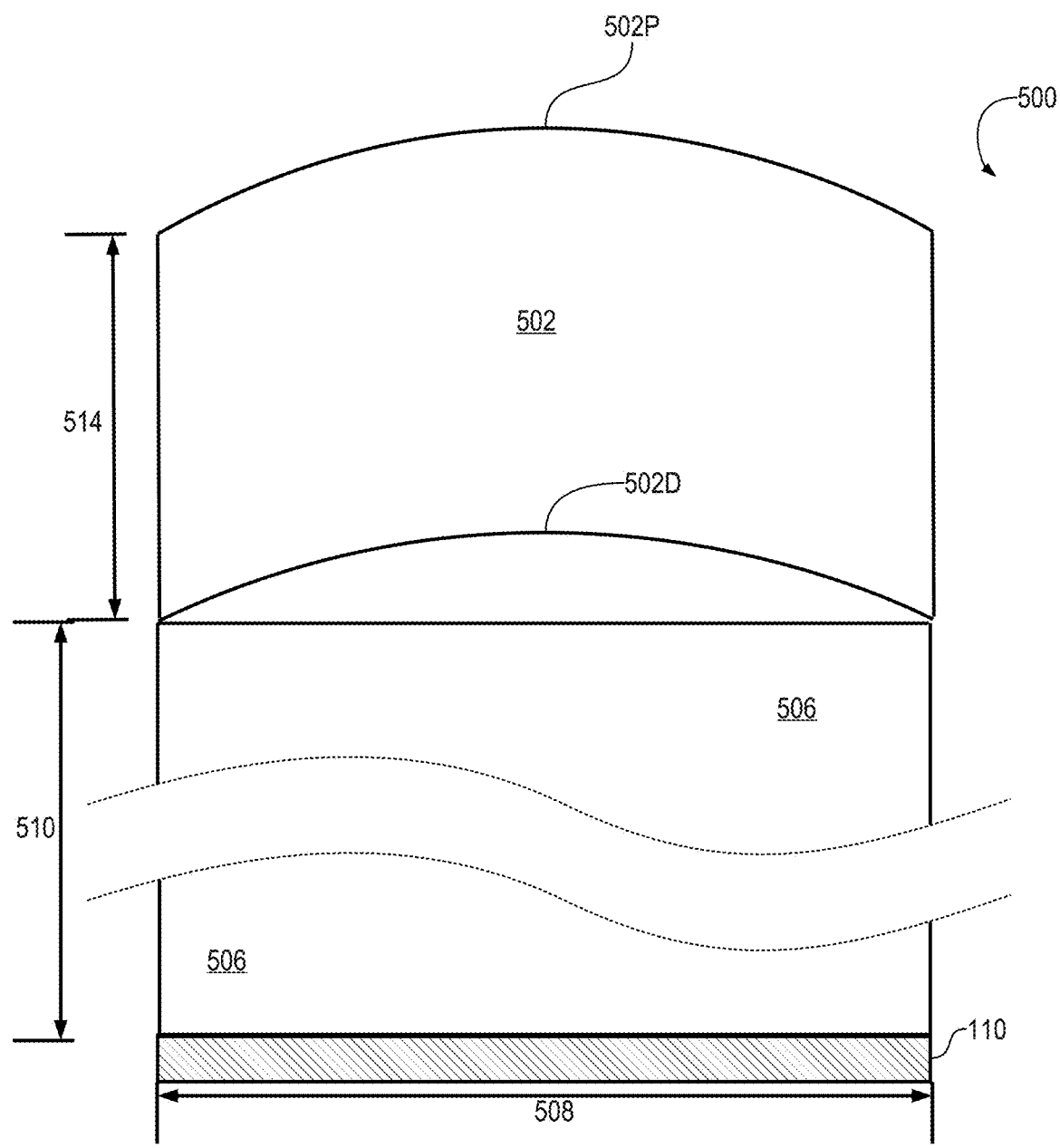
FIG. 5 is an example cross-section view of a lenticle of a respective embodiment of the lenticular array of FIG. 1 in accordance with the present invention.

FIG. 5 shows a single lenticle 500 of lenticular array 100 (FIG. 1) in cross section. Lenticle 500 (FIG. 5) includes a meniscus-cylinder lens 502. As used herein, a "cylinder" is not limited to cylinders with circular cross-sections. Meniscus-cylinder lens 502 includes a proximal surface 502P and a distal surface 502D, a width 508, and a thickness 514. Proximal surface 502P is convex, and distal surface 502D is concave. In this illustrative embodiment, width 508 and thickness 514 are one (1) millimeter (mm) each. In one embodiment, the radius of curvatures of proximal surface 502P and distal surface 502D are 1.29 mm. In addition, meniscus-cylinder lens 502 is separated from display 110 by a transparent layer 506 of glass or plastic whose thickness 510 is 9 mm.

Figure 8:
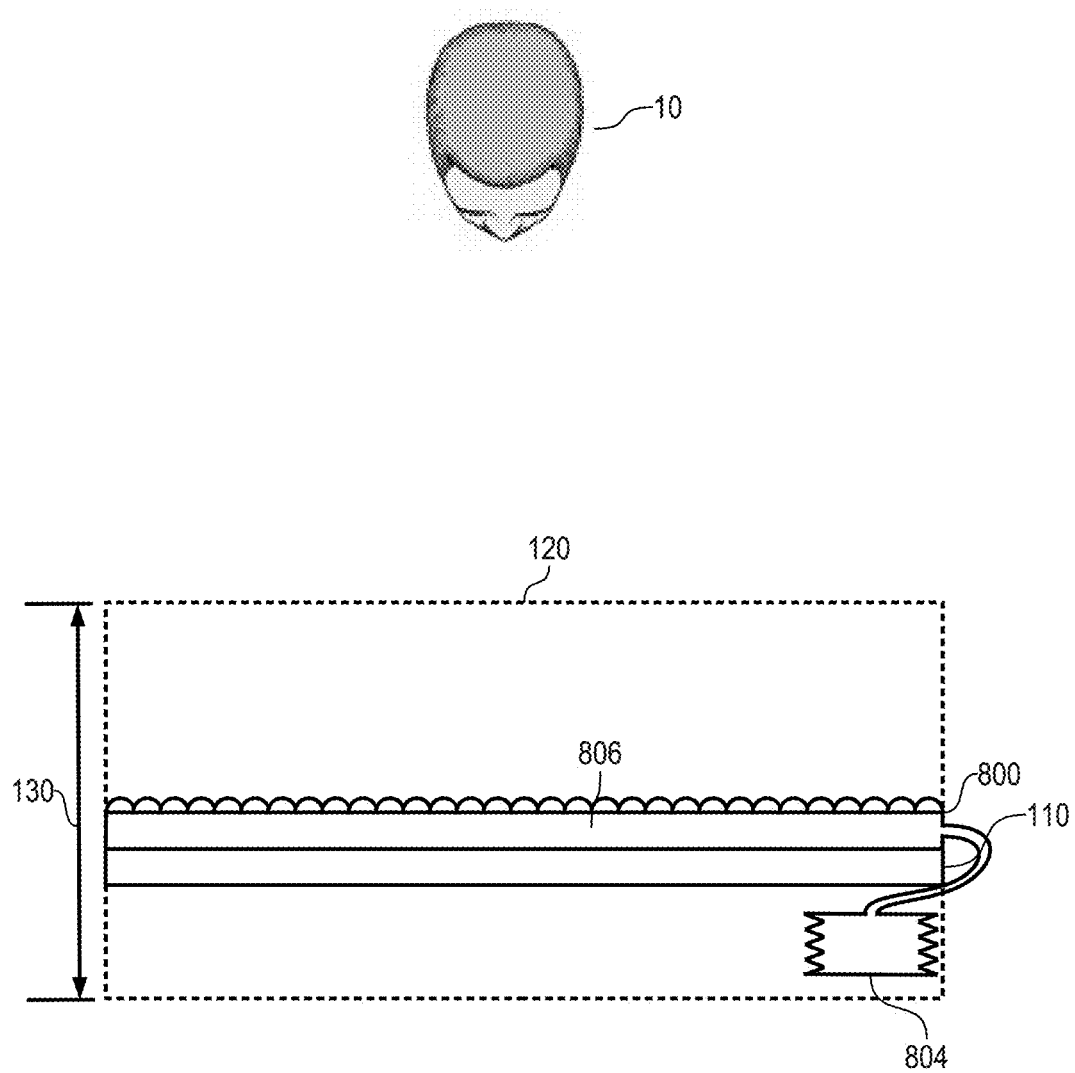
FIG. 8 is an example lenticular array in an embodiment.

In an alternative embodiment, transparent layer 506 is ordinary air, nitrogen, or some other gas. FIG. 8 shows a lenticular array 800 in which transparent layer 806 is air. To prevent moisture or anything that might fog or otherwise reduce transparency of transparent layer 806, transparent layer 806 is sealed from ambient air. To prevent warping of lenticular array 800 by changes in ambient air pressure, transparent layer 806 is connected to a bladder 804 such that air of transparent layer 806 can freely move into and out of bladder 804. As a result, air pressure within transparent layer 806 is therefore in equilibrium with air pressure outside of transparent layer 806, avoiding any warping of lenticular array 800. Bladder 804 is shown significantly enlarged for illustration purposes. In general, bladder 804 should be designed to be as small and unobtrusive as possible while still accepting and releasing an amount of air to accommodate the greatest and least expected ambient air pressures without appreciably affecting the air pressure or restricting air flow.

Figure 9:
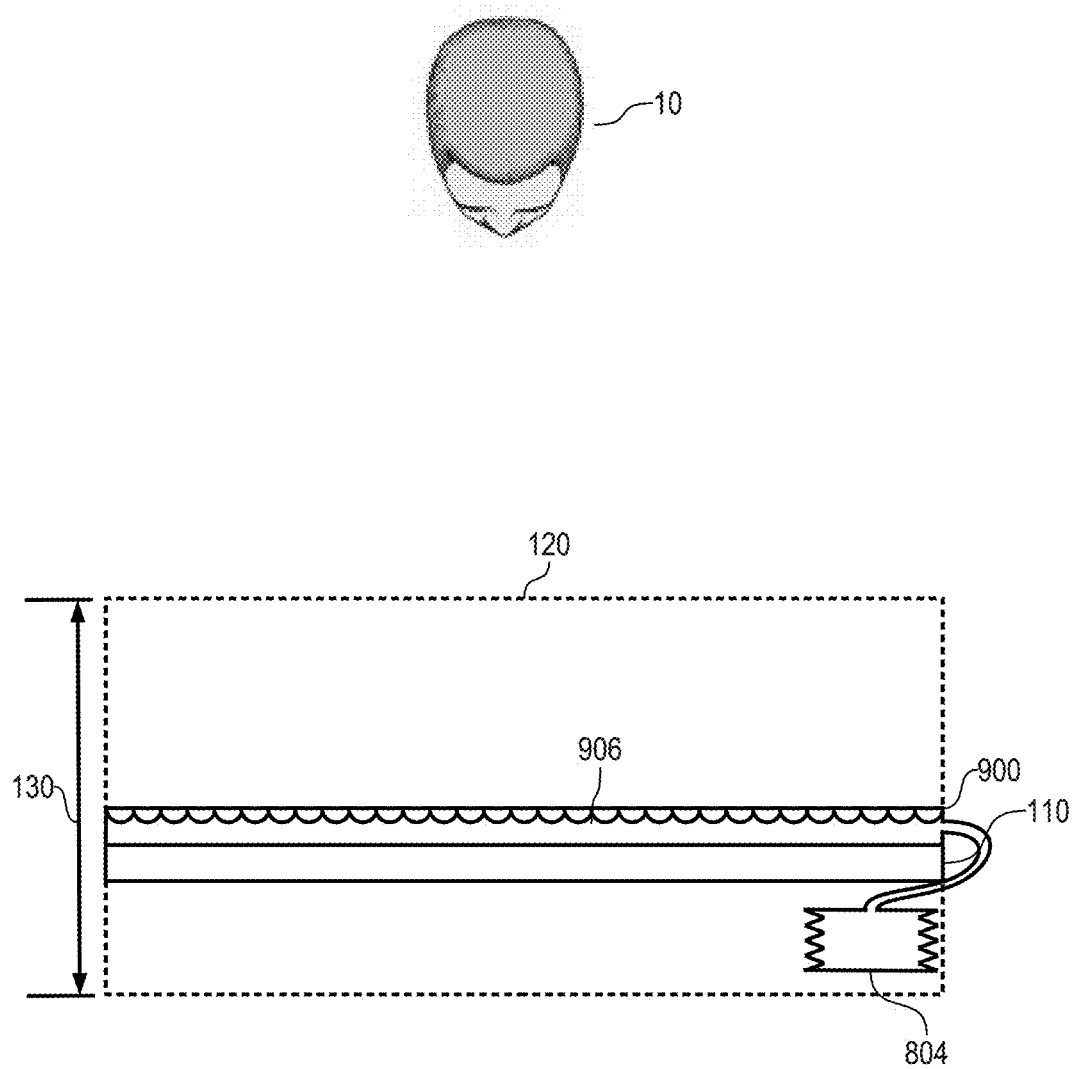
FIG. 9 is an example lenticular array and a multi-view display in an embodiment.

One of the advantages of a transparent layer of air between a lenticular array and a multi-view display such as display 110 is that convex surfaces of the lenticular array can be positioned toward display 110 as shown in FIG. 9. Such allows a flat surface of lenticular array 900 to be easily cleaned while the convex surfaces of lenticles of lenticular array 900 simply fit into the air space of a transparent layer 906.

Returning to FIG. 5, a meniscus-cylinder lens dramatically flattens the field of view of lenticle 500 having such a long focal length, ten (10) times thickness 514 in this illustrative embodiment.

Other designs of lenticle 500 also reduce other aberrations, such as coma and circular aberration. Coma is well-known and is not described further herein. Lenticles which have a circular-cylindrical proximal surfaces have aberrations (sometimes referred to herein as "circular aberrations") that are two-dimensional analogs to spherical aberrations, which are also well-known and are not described further herein.

One embodiment that further flattens the field of view from even more extreme angles and reduces other aberrations has a radius of curvature of 1.894 mm on proximal surface 502P and a radius of curvature of 2.131 mm on distal surface 502D. In addition, proximal surface 502P and distal surface 502D can reduce circular aberrations by being made non-circular, e.g., parabolic, in cross-section.

Figure 6:
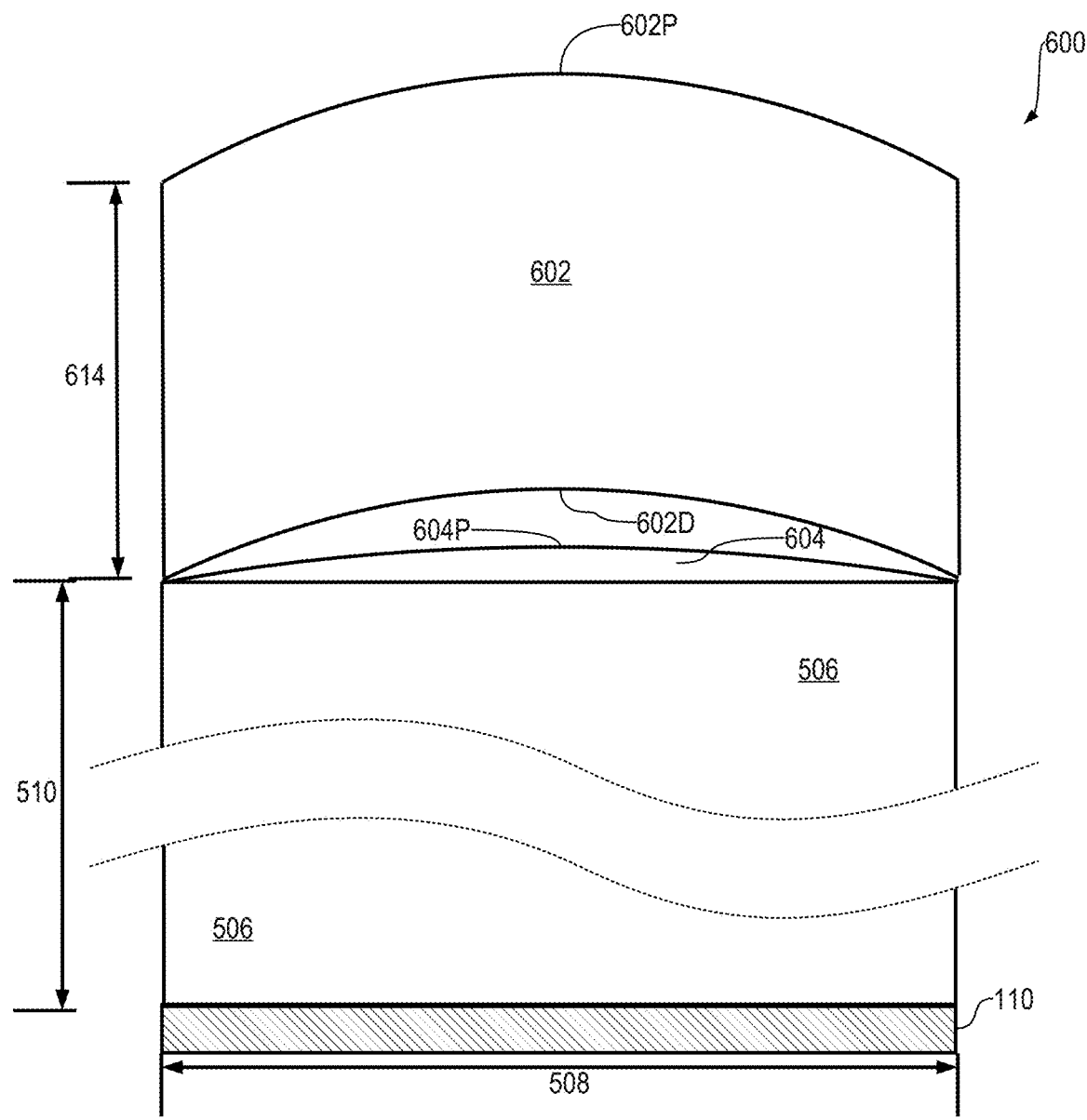
FIG. 6 is an example cross-section view of a lenticle of a respective embodiment of the lenticular array of FIG. 1 in accordance with the present invention.

An alternative embodiment of lenticle 500 is shown in cross-section as lenticle 600 (FIG. 6). In addition to a meniscus-cylinder lens 602 having a proximal surface 602P with a radius of curvature of 1.894 mm and a distal surface 602D with a radius of curvature of 2.131 mm and a thickness 614 of 0.5 mm. In addition, lenticle 600 includes a piano-convex lens 604 with a proximal surface 604P having a radius of curvature of 9.302 mm. Lenticle 600 includes the same transparent layer as does lenticle 500 (FIG. 5).

Figure 7:
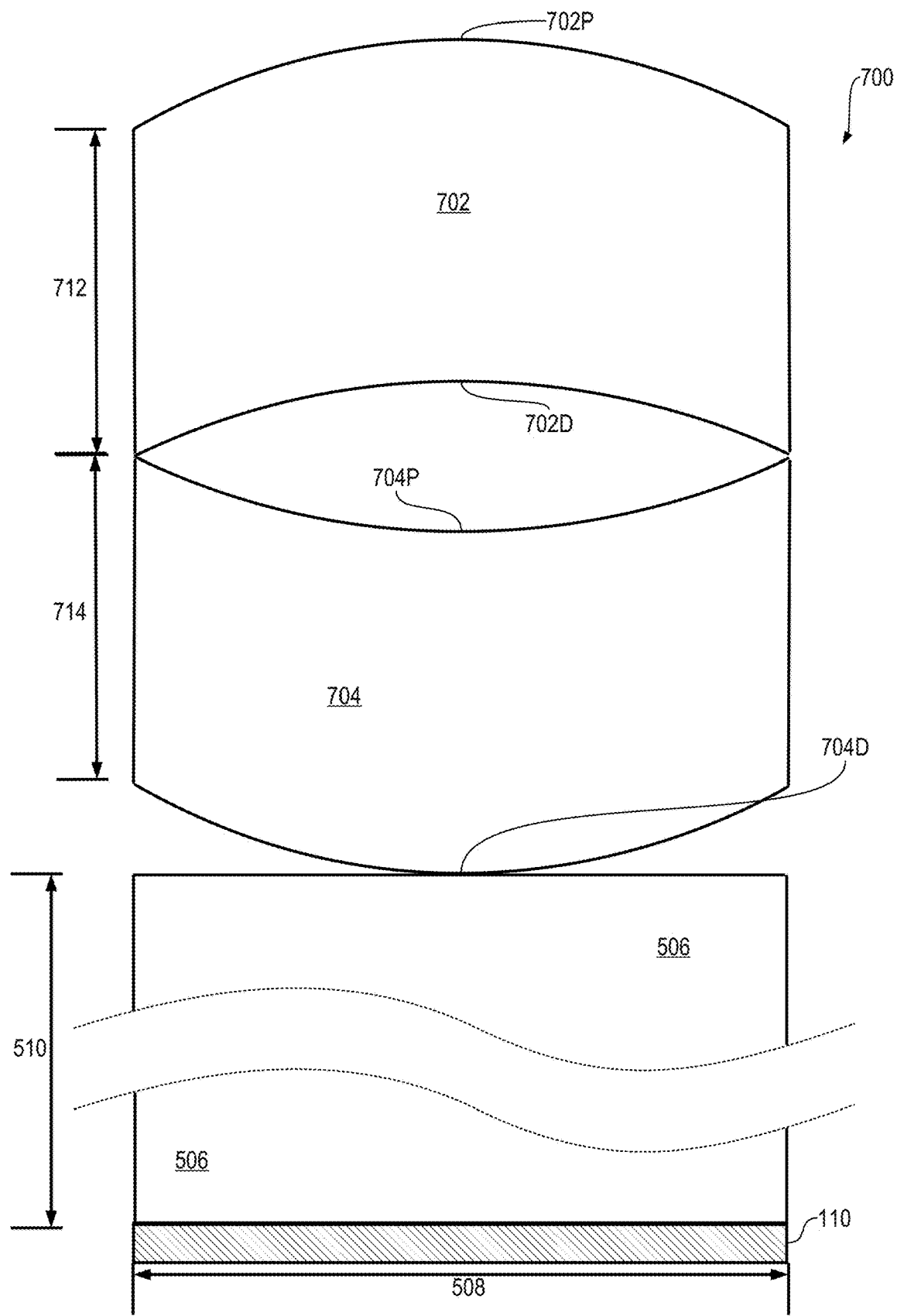
FIG. 7 is an example cross-section view of a lenticle of a respective embodiment of the lenticular array of FIG. 1 in accordance with the present invention.

Another alternative to lenticles 500 and 600 is lenticle 700 (FIG. 7). Lenticle 700 includes a proximal meniscus-cylinder lens 702 and a distal meniscus-cylinder lens 704. Proximal meniscus-cylinder lens 702 is directly analogous to meniscus-cylinder lens 502 (FIG. 5). Distal meniscus-cylinder lens 704 is reversed, having a proximal surface 704P that is concave and a distal surface that is convex. In this illustrative embodiment, distal meniscus-cylinder lens 704 is of the same dimensions as proximal meniscus-cylinder lens 702, aside from having convex and concave surfaces reversed.

In some embodiments, optical aberrations resulting from lenticles with unusually long focal lengths are reduced in a manner described in U.S. patent application Ser. No. 12/969,552 filed Dec. 15, 2010 by Dr. Richard A. Muller for "Improved Resolution For Autostereoscopic Video Displays" at FIGS. 5-7 and accompanying text in the Application. That description is incorporated herein by reference.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for designing a stereoscopic display, comprising:
    selecting a depth of a projection area, wherein the projection area is generated by a lenticular array, comprising at least two lenticles, operatively coupled to a display;
    identifying a number of views comprised within the display, wherein a view comprises a subset of an image; and
    identifying a distance from a portion of the display to at least one of the lenticles, wherein the at least one of the lenticles is a lenticle that the portion of the display is shown through, wherein the distance from the portion of the display to at least one of the lenticles establishes a minimal amount of lenticular crosstalk;
    wherein one of: the identifying a number of views and identifying a distance is computed via the calculation:

$$2d=4n_v f;$$

wherein d is the depth of the projection area, wherein $n_v$ is the number of views, and wherein f is the distance.

2. The stereoscopic display of claim 1, wherein the selected depth is greater than 1 meter.

3. The stereoscopic display of claim 1, wherein the selected depth is greater than 50 centimeters.

4. The stereoscopic display of claim 1, wherein the selected depth is at least equal to a width of the display.

5. The stereoscopic display of claim 1, wherein the selected depth is at least equal to one half a width of the display.

6. A method for designing a stereoscopic display, comprising:
    selecting a depth of a projection area, wherein the projection area is generated by a lenticular array, comprising at least two lenticles, operatively coupled to a display;
    identifying a number of views comprised within the display, wherein a view comprises a subset of an image; and
    identifying a distance from a portion of the display to at least one of the lenticles, wherein the at least one of the lenticles is a lenticle that the portion of the display is shown through, wherein the distance from the portion of the display to at least one of the lenticles establishes a minimal amount of lenticular crosstalk;
    identifying a width of at least one of lenticles; and
    identifying a distance from the lenticular array to a user;
    wherein one of: the identifying a number of views, identifying a distance from a portion of the display, identifying a width, and identifying a distance from the lenticular array, is computed via the calculation:

$$2n_v f = \frac{dD - S^2}{D+d};$$

wherein d is the depth of the projection area, wherein $n_v$ is the number of views, wherein f is the distance from a portion of the display, wherein S is the width, and wherein D is the distance from the lenticular array.

7. The stereoscopic display of claim 6, wherein the selected depth is greater than 1 meter.

8. The stereoscopic display of claim 6, wherein the selected depth is greater than 50 centimeters.

9. The stereoscopic display of claim 6, wherein the selected depth is at least equal to a width of the display.

10. The stereoscopic display of claim 6, wherein the selected depth is at least equal to one half a width of the display.

* * * * *